June 12, 1956　　　J. K. MOSHER　　　2,749,932
FLUID PRESSURE ACTUATED VALVE WITH
MECHANICAL CLEANING ATTACHMENT
Filed June 27, 1951

INVENTOR.
James K. Mosher
BY
Wilfred E. Lawson
ATTORNEY

United States Patent Office 2,749,932
Patented June 12, 1956

2,749,932

FLUID PRESSURE ACTUATED VALVE WITH MECHANICAL CLEANING ATTACHMENT

James K. Mosher, Pasadena, Calif., assignor to Schulz Tool and Manufacturing Co., San Gabriel, Calif., a corporation of California Application June 27, 1951, Serial No. 233,745

1 Claim. (Cl. 137—244)

This invention relates to a fluid pressure actuated valve, and more particularly to a self-cleaning valve adapted to be used for controlling the fluid level in a tank.

This invention is an improvement on the valve shown and described in my copending application, Serial No. 185,839, filed September 20, 1950, and is a continuation-in-part of that application.

The object of the invention is to provide a mechanism for preventing the valve shown and described in my copending application, Serial No. 185,839, from becoming clogged due to foreign matter that may be in the fuel or other fluid.

Another object of the invention is to provide a valve which includes an apertured plate that is adapted to be raised and lowered as the main valve is caused to rise and fall, due to the action of the pilot valve, whereby stationary pins will dislodge any dirt or foreign matter from the apertures in the plate, so that there will be no interference with the normal action of the main valve.

A further object of the invention is to provide a valve assembly which includes a main valve that is operated by a pilot valve, there being a mechanism actuated by movement of the main valve to filter or clean the fuel passing through the valve, whereby foreign matter will not interfere with or impede operation of the valve.

A still further object of the invention is to provide a mechanism which is adapted to be used with the valve shown and described in my copending application, Serial No. 185,839, wherein the filter screen need not be used, and wherein any foreign matter that may be in the fuel, such as foreign matter encountered under combat conditions, will not interfere with the operation of the valve.

A still further object of the invention is to provide a valve which is extremely simple and inexpensive to manufacture.

Other objects and advantages will be apparent during the course of the following description.

In the accompanying drawings forming a part of this application, and in which like numerals have been used to designate like parts throughout the several views.

Figure 1:
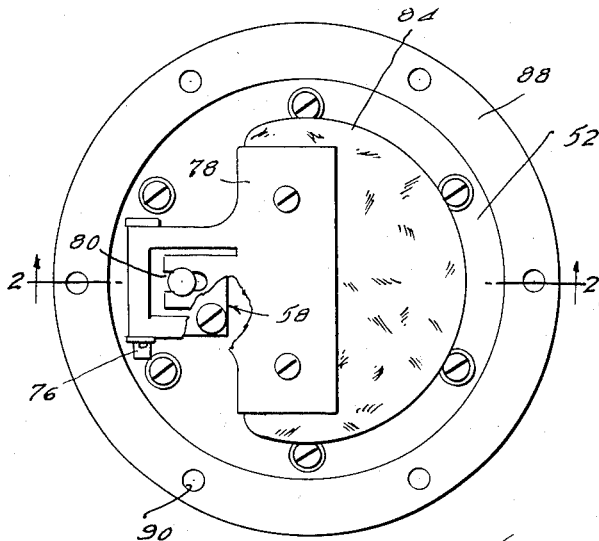
Figure 1 is a top plan view of the valve of the present invention, with parts broken away.
Figure 3:
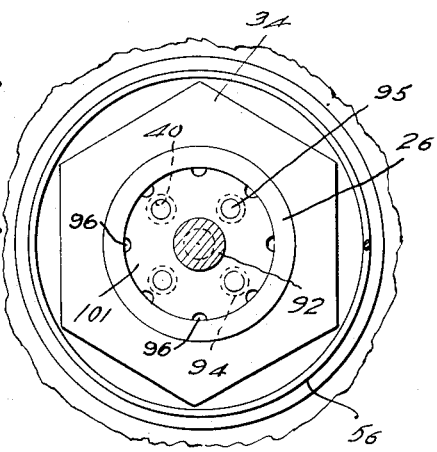
Figure 3 is a sectional view taken on the line 3—3 of Figure 2.
Figure 2:
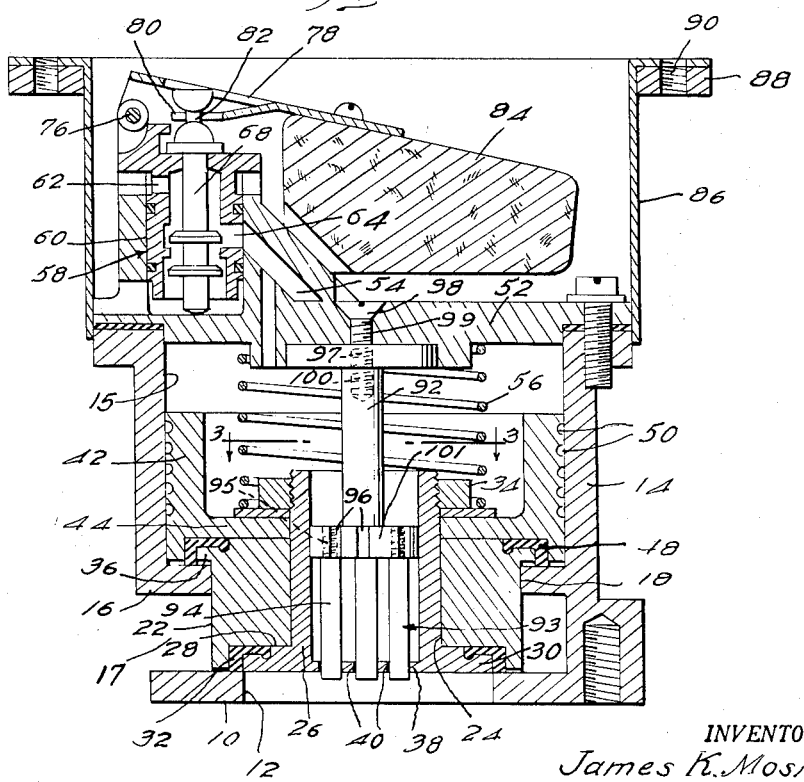
Figure 2 is a sectional view taken on the line 2—2 of Figure 1.

Referring in detail to the drawings, there is shown a valve assembly which includes a valve seat 10 that has extending therethrough a flow passage 12, the valve seat 10 carrying a valve body or cylinder 14. The cylinder 14 has an axially extending cylindrical bore 15 which terminates short of the lower end of the cylinder to provide an inturned flange 16 which forms an opening 18 which is arranged in alignment with the flow passage 12. The seat 10 is supported on the cylinder 14 and spaced from the inturned flange 16 to provide a laterally extending outlet passageway 17 between the seat and the outer face of the annular flange 16 opening from the flow passage 12. Mounted for movement in the opening 18 formed by the flange 16 of the cylinder 14 is a valve 22, and the valve 22 is provided with an enlarged opening 24 adapted to receive therein a bushing 26. The end of the passage or opening 24 adjacent the valve seat 10 opens into an enlarged annular recess 28, and mounted on the end of the bushing 26 adjacent the seat 10 is an annular flange 30 which is seated in the recess 28. There is further provided an annular band of packing material 32, the lower edge of which projects beyond the end of the valve 22 for engaging the seat 10 when the valve 22 is in closed position.

The end of the bushing 26 remote from the flange 30 projects beyond the end of the valve 22 and is threaded exteriorly for engagement by a coupling nut 34, whereby the hereinafter described piston is connected to the valve. The valve 22 projects into the cylinder 14 and is provided with an annular flange 36. The bushing is provided with a head or plate 38 which is formed or provided with a plurality of spaced openings or orifices 40 by which fluid entering the flow passage 12 is conducted into the cylinder 14.

Mounted for sliding movement in the cylinder 14 is a piston 42 which has mounted thereon, or formed integrally therewith, a head 44. A packing ring 48 is provided, so that when the valve 22 is in closed position, the packing or seal 48 will form an effective seal against the flange 16. Also, this will insure that metal-to-metal contact between the seat 10, valve 22, flange 16 and piston 42 will be avoided. Further, it is to be noted that the opening 18 is of slightly larger diameter than the diameter of the valve 22, so that metal-to-metal contact is eliminated and also freedom of movement of the valve is assured. The diameter of the piston 42 is such that it will freely slide within the cylinder 14, and the piston is provided with longitudinally spaced annular grooves 50 in which grit particles may collect, and thereby avoid damage to the working parts.

The end of the cylinder 14 remote from the valve seat 10 is closed by a head 52 which is provided with a fluid discharge port 54. A coil spring 56 is interposed between the head 52 of the cylinder 14, and the head 44 of the piston 42 for normally urging the valve 22 toward the seat 10 and thereby maintain the flow passage closed so long as any fluid pressure remains in the cylinder 14 behind the piston 42.

In order to regulate the building up of fluid pressure within the cylinder 14, there is provided a float valve which is designated by the numeral 58. The valve 58 comprises a cylinder 60 which is carried by the head 52, and the cylinder is provided with a discharge opening 62 and an inlet opening 64 which communicates with the discharge port 54. Mounted for sliding movement in the cylinder 60 is a shaft or valve stem designated generally by the numeral 68. The construction of the pilot valve 58 is shown and described more fully in a copending application. When the valve 68 is in open position, the fluid can flow from the port 64 through the port 62, but when the valve closes, no fluid will be able to flow through the ports 62 and 64.

Pivotally mounted, as at 76, adjacent the cylinder 60 is an arm 78 which carries a fork 80, the fork 80 being received in a groove 82 that is formed in the shaft 68. A float 84 is connected to the arm 78 so that the arm 78 will be moved upwardly about its pivot upon upward movement of the float 84, to thereby move the valve 68 in the cylinder 60 and close the port 64. When the float 84 moves in the opposite direction, the valve or shaft 68 will be moved downwardly in the cylinder 60, so that the port 64 will be uncovered.

A cage 86 is carried by the head 62 and surrounds the float 84 and valve 58. This cage is provided adjacent its upper end with an annular flange and carries an attaching ring 88, there being a plurality of spaced, internally threaded openings 90 in the ring 88, whereby the entire unit can be suspended from the top of a conventional fuel tank.

The valve shown and described in my copending application, Serial No. 185,839, is provided with a filtering screen, but because of extremely dirty fuel encountered under combat conditions, the foreign matter contained in the fuel very quickly clogs the screen, thereby rendering the valve inoperative. Therefore, it has been deemed advisable to provide a means for preventing the foreign matter from clogging the valve. Thus, the fluid orifices 40 are self cleaning and will not become clogged due to the foreign matter that may be in the fuel. In lieu of the mesh screen, the plate 38 is provided and the plate 38 may be provided with a plurality of orifices or openings 40. Depending downwardly from the head 52 of the valve is a shaft 92, and supported by the shaft 92 is a plurality of pins 93. Each of the pins 93 includes a cylindrical stem 94 that projects through one of the orifices 40, there being a reduced diameter shank 95 arranged on the upper end of each of the pins 93 for mounting the pins on a disk 101 that may be formed integrally with or secured to the shaft 92. The disk 101 is provided with a series of openings or grooves 96 around the periphery of the disk for passage of fluid from the orifices 40 into the chamber of the main valve above the piston 42.

The stems 94 of the pins 93 are of less diameter than the orifices 40, and the stems 94 project through the orifices 40. Thus, as the pilot valve, which is operated by the float 84, is actuated, the main valve will be caused to rise or fall, and since the plate 38 is attached to the main valve or formed integrally therewith, the plate 38 will rise and fall with the main valve. The pins 93, on the other hand, are stationary, so that any dirt which may have become lodged between the orifices 40 and the pins therewithin will be dislodged and will not impede the action of the main valve.

For securing the shaft 92 in place, a pin 97 has its head 98 secured to the head 52 of the valve. The pin 97 further includes a threaded stem 99 that is secured within a socket or opening 100 that is arranged in the upper end of the shaft 92.

In use, fluid enters the flow passage 12 under pressure, and this fluid will tend to lift the valve 22 off the seat 10. However, as long as the port 54 in the head 52 remains closed, the fluid passing through the orifices 40 will enter the cylinder 14 behind the piston 42, and due to the fact that the area of the piston is greater than the area of the surface of the valve 22 exposed to the fluid, the valve 22 will remain seated on the seat 10 and in closing relation with respect to the flow passage 12. When the fluid level in the fuel tank falls below a predetermined level, the float 84 will move downwardly about its pivot 76 to thereby move the valve 68 downwardly to thus open the port 64 so as to establish a flow of fluid through the port 54 and port 64 up through the valve 58 and into the fuel tank.

As soon as the level in the tank attains a predetermined value, the float 84 will move upwardly, thus causing the plunger 68 of the valve 58 to close the port 64 and thus shut off the flow of fluid through the port 54 to thereby build up pressure in the cylinder 14 behind the piston 42. As the pressure builds up within the cylinder, the piston 42 will move downwardly, causing the valve 22 to move against the pressure of the fluid in the fluid passage 12 until the seals 32 and 48 engage the seat 10 and flange 16, respectively, at which time the passage of fluid through the flow passage 12 will be arrested. As the fuel in the tank is withdrawn, the float 84 will again fall until the valve 68 opens the port 64 in the valve 58, when the cycle will be repeated. In this way, positive seating of the valve 22 on its seat 10 is assured as the pressure of the fuel is employed against the piston 42 to seat the valve.

By means of the mechanism of the present invention, foreign matter which may be contained in the fuel will not render the valve inoperative. Thus, in many cases when aircraft are used under combat conditions, the fuel becomes extremely dirty and the foreign matter contained in the fuel may render the valve inoperative. However, the orifices 40 are self cleaning and will not clog, even though foreign matter may be present in the fuel. Thus, the plate 38 has the orifices 40 arranged therein, and the stems 94 project through the orifices 40. Thus, as the pilot valve is operated by the float 84, this will cause the main valve to rise and fall so that the plate 38 will also rise and fall with the main valve. The pins 93, on the other hand, are secured in a stationary manner to the bottom of the disk 101, so that any dirt which may have become lodged between the orifices 40 and the pins 93 therewithin will be dislodged and will not impede the action of the main valve.

What is claimed is:

In a fluid pressure actuated valve, the combination comprising: a valve body; a cylindrical bore in said body and terminating short of one end of the body to provide an inwardly extending annular flange defining a circular opening in said one end; a valve seat spaced from said one end of the valve body and supported on the body to provide a laterally extending outlet passageway between the inner face of said seat and the outer face of said annular flange; a fluid inlet passageway through said seat and opening into said outlet passageway; a valve element seating against the seat around said inlet passageway and slidable in said circular opening; said valve element having piston means slidable in the bore; a head covering the outer end of the bore, said head and valve element defining end walls of a chamber in said bore; spring means in said chamber biasing said valve element toward its seat; conduit means permitting flow of fluid from said chamber; a pilot valve associated with said conduit means for controlling the flow of fluid from the chamber; an axially extending fluid passageway through said valve element providing for direct flow of fluid from the said inlet passageway to the said chamber; a plate across the inner end of the said axially extending passageway, said plate being fixed with respect to the valve element; a plurality of apertures in said plate; a shaft supported from said head and extending into said axially extending passageway; a disk on the end of said shaft and slidable with respect to said axially extending passageway, said disk being open to the passage of fluid therethrough; and a plurality of parallel pins mounted on said disk, each of said apertures having one of said pins extending through it, said apertures being larger than the cross-sectional area of their respective pins, whereby said chamber is open at all times to leakage of fluid from said inlet passageway and through said apertures.

References Cited in the file of this patent

UNITED STATES PATENTS

| | | |
|---|---|---|
| 711,349 | Schlaepfer | Oct. 14, 1902 |
| 956,158 | Pasman | Apr. 26, 1910 |
| 1,046,236 | Wagner | Dec. 3, 1912 |
| 1,236,617 | Speakman | Aug. 14, 1917 |
| 1,504,201 | Anderson | Aug. 12, 1924 |
| 1,560,770 | Everstam | Nov. 10, 1925 |
| 1,813,709 | Pasman | July 7, 1931 |
| 1,877,780 | Ackerman | Sept. 20, 1932 |